United States Patent
Asano

(10) Patent No.: US 8,270,033 B2
(45) Date of Patent: Sep. 18, 2012

(54) GENERATING EMBED-IMAGE BY DIVIDING EMBED-INFORMATION INTO BLOCKS AND GENERATING AN INFORMATION PATTERN AND POSITIONING PATTERN

(75) Inventor: Motohiro Asano, Osaka (JP)

(73) Assignee: Konica Minolta Business Technologies, Inc. (JP)

( * ) Notice: Subject to any disclaimer, the term of this patent is extended or adjusted under 35 U.S.C. 154(b) by 575 days.

(21) Appl. No.: 12/530,024

(22) PCT Filed: Feb. 20, 2008

(86) PCT No.: PCT/JP2008/052839
§ 371 (c)(1),
(2), (4) Date: Sep. 4, 2009

(87) PCT Pub. No.: WO2008/111375
PCT Pub. Date: Sep. 18, 2008

(65) Prior Publication Data
US 2010/0128322 A1    May 27, 2010

(30) Foreign Application Priority Data
Mar. 14, 2007  (JP) .................. 2007-064721

(51) Int. Cl.
*H04N 1/44*   (2006.01)
*B41M 3/14*   (2006.01)
*G06K 9/00*   (2006.01)

(52) U.S. Cl. ................ 358/3.26; 358/1.18; 382/100

(58) Field of Classification Search .......... 358/3.26, 358/1.18, 453; 382/100, 173, 276, 282, 294, 382/306; 283/72, 93, 113, 901, 902; 380/55; 235/487, 494
See application file for complete search history.

(56) References Cited

U.S. PATENT DOCUMENTS

| | | | |
|---|---|---|---|
| 5,671,277 A | 9/1997 | Ikenoue et al. | 380/7 |
| 5,987,127 A | 11/1999 | Ikenoue et al. | 380/7 |
| 6,738,491 B1 | 5/2004 | Ikenoue et al. | 382/100 |
| 7,065,226 B1 * | 6/2006 | Anzai et al. | 382/100 |
| 7,277,577 B2 * | 10/2007 | Ying et al. | 382/168 |
| 8,073,188 B2 * | 12/2011 | Onishi et al. | 382/100 |
| 8,160,294 B2 * | 4/2012 | Takahashi et al. | 382/100 |
| 2002/0135810 A1 | 9/2002 | Ikenoue et al. | 358/3.28 |
| 2004/0105571 A1 | 6/2004 | Ikenoue et al. | 382/100 |
| 2007/0030521 A1 * | 2/2007 | Fujii et al. | 358/3.28 |
| 2007/0195992 A1 | 8/2007 | Ikenoue et al. | 382/100 |
| 2008/0049259 A1 * | 2/2008 | Asano | 358/3.28 |
| 2009/0190796 A1 * | 7/2009 | Asano | 382/100 |
| 2009/0196458 A1 * | 8/2009 | Sakai et al. | 382/100 |

FOREIGN PATENT DOCUMENTS

| | | |
|---|---|---|
| JP | 6-22119 A | 1/1994 |
| JP | 2000-138820 A | 5/2000 |
| JP | 2004-112607 A | 4/2004 |
| JP | 2004-228739 A | 8/2004 |
| JP | 2007-49440 A | 2/2007 |
| WO | WO 2008/111375 | 9/2008 |

* cited by examiner

*Primary Examiner* — Scott A Rogers
(74) *Attorney, Agent, or Firm* — Cantor Colburn LLP

(57) ABSTRACT

It is possible to provide an image processing device, an image processing method, and its program which generate a positioning pattern of an information pattern in accordance with block information. This eliminates the problem that a block number cannot be identified although an information block position can be identified, i.e., the problem that information for identifying an information block cannot be sufficiently extracted. If an information pattern is identified, the extracted information can be used effectively. Moreover, it is possible to enhance the information embedding efficiency.

14 Claims, 16 Drawing Sheets

FIG. 7

| FIRST INFORMATION BLOCK IB1 | SECOND INFORMATION BLOCK IB2 | THIRD INFORMATION BLOCK IB3 | FOURTH INFORMATION BLOCK IB4 | FIFTH INFORMATION BLOCK IB5 |
|---|---|---|---|---|
| 1001011...100 | 0111010...000 | 1000100...011 | 1101100...010 | 0010100...001 |
| 120 BITS | 120 BITS | 120 BITS | 120 BITS | 120 BITS |

EMBED-INFORMATION INF (600 BITS)

FIG. 8

| EXAMPLE OF EMBED-DATA (120 BITS) OF SECOND INFORMATION BLOCK IB2 | | |
|---|---|---|
| PATTERN NUMBER | EXAMPLE OF EMBED-DATA UNIT EU (5 BITS) | |
| | BINARY | DECIMAL |
| 1ST PATTERN | 01110 | 14 |
| 2ND PATTERN | 10100 | 20 |
| 3RD PATTERN | 11110 | 30 |
| 4TH PATTERN | 00101 | 5 |
| 5TH PATTERN | 10000 | 16 |
| 6TH PATTERN | 000000 | 0 |
| 7TH PATTERN | 01001 | 9 |
| 8TH PATTERN | 10111 | 23 |
| 9TH PATTERN | 00010 | 2 |
| 10TH PATTERN | 10001 | 17 |
| 11TH PATTERN | 11010 | 26 |
| 12TH PATTERN | 111111 | 31 |
| 13TH PATTERN | 11000 | 24 |
| 14TH PATTERN | 00101 | 5 |
| 15TH PATTERN | 100001 | 17 |
| 16TH PATTERN | 00111 | 7 |
| 17TH PATTERN | 00001 | 1 |
| 18TH PATTERN | 01011 | 11 |
| 19TH PATTERN | 11101 | 29 |
| 20TH PATTERN | 01101 | 13 |
| 21TH PATTERN | 10010 | 18 |
| 22TH PATTERN | 01111 | 15 |
| 23TH PATTERN | 11001 | 25 |
| 24TH PATTERN | 01000 | 8 |

FIG. 10

| DOT PATTERN TABLE TB1 | | | |
|---|---|---|---|
| EMBED-DATA UNIT EU | | INFORMATION DOT | NUMBER OF |
| BINARY | DECIMAL | [abcd  efgh] | ON-DOTS |
| 00000 | 0 | 0000  0111 | |
| 00001 | 1 | 0000  1011 | |
| 00010 | 2 | 0001  0011 | |
| 00011 | 3 | 0010  0011 | |
| 00100 | 4 | 0100  0011 | |
| 00101 | 5 | 1000  0011 | |
| 00110 | 6 | 0000  1101 | |
| 00111 | 7 | 0001  0101 | |
| 01000 | 8 | 0010  0101 | |
| 01001 | 9 | 0100  0101 | |
| 01010 | 10 | 1000  0101 | |
| 01011 | 11 | 0001  1001 | |
| 01100 | 12 | 0010  1001 | |
| 01101 | 13 | 0100  1001 | |
| 01110 | 14 | 1000  1001 | |
| 01111 | 15 | 0011  0001 | |
| 10000 | 16 | 0101  0001 | |
| 10001 | 17 | 1001  0001 | |
| 10010 | 18 | 0110  0001 | 3 |
| 10011 | 19 | 1010  0001 | |
| 10100 | 20 | 1100  0001 | |
| 10101 | 21 | 0000  1110 | |
| 10110 | 22 | 0001  0110 | |
| 10111 | 23 | 0010  0110 | |
| 11000 | 24 | 0100  0110 | |
| 11001 | 25 | 1000  0110 | |
| 11010 | 26 | 0001  1010 | |
| 11011 | 27 | 0010  1010 | |
| 11100 | 28 | 0100  1010 | |
| 11101 | 29 | 1000  1010 | |
| 11110 | 30 | 0011  0010 | |
| 11111 | 31 | 0101  0010 | |
| FIRST SPECIAL PATTERN SP1 | | 1001  0010 | |
| SECOND SPECIAL PATTERN SP2 | | 0110  0010 | |
| THIRD SPECIAL PATTERN SP3 | | 1010  0010 | |
| FOURTH SPECIAL PATTERN SP4 | | 1100  0010 | |
| FIFTH SPECIAL PATTERN SP5 | | 0001  1100 | |

DATA VALUE 10 = 1000 0101

LO
IB2 125
101  102

| 1ST PATTERN (14) | 2ND PATTERN (20) | 3RD PATTERN (30) | 4TH PATTERN (5) | 5TH PATTERN (16) |
|---|---|---|---|---|
| 6TH PATTERN (0) | 7TH PATTERN (9) | 8TH PATTERN (23) | 9TH PATTERN (2) | 10TH PATTERN (17) |
| 11TH PATTERN (26) | 12TH PATTERN (31) | SECOND SPECIAL PATTERN SP2 | 13TH PATTERN (24) | 14TH PATTERN (5) |
| 15TH PATTERN (17) | 16TH PATTERN (7) | 17TH PATTERN (1) | 18TH PATTERN (11) | 19TH PATTERN (29) |
| 20TH PATTERN (13) | 21ST PATTERN (18) | 22ND PATTERN (15) | 23RD PATTERN (25) | 24TH PATTERN (8) |

DESCRIPTION IN PARENTHESIS REPRESENTS DATA VALUE

FIG. 17a

| HISTOGRAM MEMORY HM OF SECOND INFORMATION BLOCK IB2 | | | | | | | | | |
|---|---|---|---|---|---|---|---|---|---|
| PATTERN NUMBER | VALUE OF EMBED-DATA UNIT EU | | | | | | | | |
| | 0 | 1 | 2 | 3 | 4 | 5 | ··· | 30 | 31 |
| 1ST PATTERN | 0 | 0 | 0 | 0 | 0 | 0 | ··· | 0 | 0 |
| 2ND PATTERN | 0 | 0 | 0 | 0 | 0 | 0 | ··· | 0 | 0 |
| 3RD PATTERN | 0 | 0 | 0 | 0 | 0 | 0 | ··· | 1 | 0 |
| 4TH PATTERN | 0 | 0 | 0 | 0 | 0 | 1 | ··· | 0 | 0 |
| ⋮ | ⋮ | ⋮ | ⋮ | ⋮ | ⋮ | ⋮ | ⋮ | ⋮ | ⋮ |
| 24TH PATTERN | 0 | 0 | 0 | 0 | 0 | 0 | ··· | 0 | 0 |

FIG. 17b

| HISTOGRAM MEMORY HM OF SECOND INFORMATION BLOCK IB2 | | | | | | | | | |
|---|---|---|---|---|---|---|---|---|---|
| PATTERN NUMBER | VALUE OF EMBED-DATA UNIT EU | | | | | | | | |
| | 0 | 1 | 2 | 3 | 4 | 5 | ··· | 30 | 31 |
| 1ST PATTERN | 0 | 0 | 0 | 0 | 0 | 0 | ··· | 0 | 0 |
| 2ND PATTERN | 1 | 0 | 0 | 0 | 0 | 0 | ··· | 0 | 0 |
| 3RD PATTERN | 0 | 0 | 0 | 1 | 0 | 0 | ··· | (86) | 0 |
| 4TH PATTERN | 0 | 1 | 0 | 0 | 0 | (67) | ··· | 0 | 0 |
| ⋮ | ⋮ | ⋮ | ⋮ | ⋮ | ⋮ | ⋮ | ⋮ | ⋮ | ⋮ |
| 24TH PATTERN | 0 | 0 | 0 | 0 | 1 | 0 | ··· | 0 | 0 |

FIG. 18a

|  | BLOCK SIZE |
|---|---|
| FIRST SPECIAL PATTERN SP1 | 5×5 |
| SECOND SPECIAL PATTERN SP2 | 7×7 |
| THIRD SPECIAL PATTERN SP3 | 9×9 |

FIG. 18b

|  | ERROR CORRECTION |
|---|---|
| FIRST SPECIAL PATTERN SP1 | NOT USE |
| SECOND SPECIAL PATTERN SP2 | USE |

FIG. 18c

|  | BLOCK SIZE | ERROR CORRECTION |
|---|---|---|
| FIRST SPECIAL PATTERN SP1 | 5×5 | NOT USE |
| SECOND SPECIAL PATTERN SP2 | 7×7 | NOT USE |
| THIRD SPECIAL PATTERN SP3 | 9×9 | NOT USE |
| FOURTH SPECIAL PATTERN SP4 | 5×5 | USE |
| FIFTH SPECIAL PATTERN SP5 | 7×7 | USE |
| SIXTH SPECIAL PATTERN SP6 | 9×9 | USE |

| 1ST PATTERN (14) | 2ND PATTERN (20) | 3RD PATTERN (30) | 4TH PATTERN (5) | 5TH PATTERN (16) |
|---|---|---|---|---|
| 6TH PATTERN (0) | SPECIAL PATTERN LEFT-TOP SPL | 7TH PATTERN (9) | 8TH PATTERN (23) | 9TH PATTERN (2) |
| 10TH PATTERN (17) | 11TH PATTERN (26) | 12TH PATTERN (31) | 13TH PATTERN (24) | 14TH PATTERN (5) |
| 15TH PATTERN (17) | 16TH PATTERN (7) | 17TH PATTERN (1) | SPECIAL PATTERN RIGHT-BOTTOM SPR | 18TH PATTERN (11) |
| 19TH PATTERN (29) | 20TH PATTERN (13) | 21ST PATTERN (18) | 22ND PATTERN (15) | 23RD PATTERN (25) |

DESCRIPTION IN PARENTHESIS REPRESENTS DATA VALUE

FIG. 20

| DOT PATTERN TABLE TB | | | |
|---|---|---|---|
| EMBED-DATA UNIT EU | | INFORMATION DOT | NUMBER OF ON-DOTS |
| BINARY | DECIMAL | [abcd  efgh] | |
| 00000 | 0 | 0000  0111 | |
| 00001 | 1 | 0000  1011 | |
| 00010 | 2 | 0001  0011 | |
| 00011 | 3 | 0010  0011 | |
| 00100 | 4 | 0100  0011 | |
| 00101 | 5 | 1000  0011 | |
| 00110 | 6 | 0000  1101 | |
| 00111 | 7 | 0001  0101 | |
| 01000 | 8 | 0010  0101 | |
| 01001 | 9 | 0100  0101 | |
| 01010 | 10 | 1000  0101 | |
| 01011 | 11 | 0001  1001 | |
| 01100 | 12 | 0010  1001 | |
| 01101 | 13 | 0100  1001 | |
| 01110 | 14 | 1000  1001 | |
| 01111 | 15 | 0011  0001 | |
| 10000 | 16 | 0101  0001 | |
| 10001 | 17 | 1001  0001 | |
| 10010 | 18 | 0110  0001 | |
| 10011 | 19 | 1010  0001 | |
| 10100 | 20 | 1100  0001 | 3 |
| 10101 | 21 | 0000  1110 | |
| 10110 | 22 | 0001  0110 | |
| 10111 | 23 | 0010  0110 | |
| 11000 | 24 | 0100  0110 | |
| 11001 | 25 | 1000  0110 | |
| 11010 | 26 | 0001  1010 | |
| 11011 | 27 | 0010  1010 | |
| 11100 | 28 | 0100  1010 | |
| 11101 | 29 | 1000  1010 | |
| 11110 | 30 | 0011  0010 | |
| 11111 | 31 | 0101  0010 | |
| 1ST SPECIAL PATTERN LEFT-TOP SPL1 | | 1001  0010 | |
| 1ST SPECIAL PATTERN RIGHT-BOTTOM SPR1 | | 0110  0010 | |
| 2ND SPECIAL PATTERN LEFT-TOP SPL2 | | 1010  0010 | |
| 2ND SPECIAL PATTERN RIGHT-BOTTOM SPR2 | | 1100  0010 | |
| 3RD SPECIAL PATTERN LEFT-TOP SPL3 | | 0001  1100 | |
| 3RD SPECIAL PATTERN RIGHT-BOTTOM SPR3 | | 0010  1100 | |
| 4TH SPECIAL PATTERN LEFT-TOP SPL4 | | 0100  1100 | |
| 4TH SPECIAL PATTERN RIGHT-BOTTOM SPR4 | | 1000  1100 | |
| 5TH SPECIAL PATTERN LEFT-TOP SPL2 | | 0011  0100 | |
| 5TH SPECIAL PATTERN RIGHT-BOTTOM SPR2 | | 0101  0100 | |

GENERATING EMBED-IMAGE BY DIVIDING EMBED-INFORMATION INTO BLOCKS AND GENERATING AN INFORMATION PATTERN AND POSITIONING PATTERN

RELATED APPLICATIONS

This application is a U.S. National Phase Application under 35 USC 371 of International Application PCT/JP2008/052839, filed Feb. 20, 2008, which claims priority to Japanese Patent Application No. 2007-064721, filed Mar. 14, 2007.

FIELD OF THE INVENTION

The present invention relates to an image processing device, image processing method and program thereof, wherein embed-information is divided into a plurality of information blocks and is embedded, and the information having been divided as a plurality of information blocks is read out.

BACKGROUND OF THE INVENTION

With ongoing improvements in the digitization of information, data embedding methods as represented by the electronic watermark method have come into common use, and have come to be applied to the analog image medium such as print-matters and reproductions in recent years.

The data embedding method for print-matters is represented by a technique, wherein, for example, information is divided into a plurality of blocks (hereinafter referred to as "information blocks"), and the information blocks are assigned with block numbers, whereby the information is embedded into the background of a document image and others at the time of printing (Patent Literature 1).

According to the method proposed in the Patent Literature 1, however, when the embedded information is read out, the data or a part thereof to be read our will be missing if the block number cannot be identified. Because of this problem, sufficient information detection performance cannot be achieved in an unreadable image wherein the background is read only in a limited area as exemplified by the document wherein letters are arranged over the entire surface.

A solution to this problem is proposed in a technique wherein the information block data wherein the block number cannot be identified is compared with other information block data wherein the block number has been identified, and the block is estimated as being the same information block as the one having a higher degree of agreement (Patent Literature 2).

Patent Literature 1: Japanese Unexamined Patent Application Publication No. 2004-112607
Patent Literature 2: Japanese Unexamined Patent Application Publication No. 2004-228739

DISCLOSURE OF THE INVENTION

Problems to be Solved by the Invention

However, when the block number is estimated depending on the degree of agreement as in the case of Patent Literature 2, if there is very similar data among a plurality of information blocks, that data will be incorrectly estimated as another block, or the estimation of block numbers will be disabled, with the result that the aforementioned problem cannot be solved.

In view of the prior art problems described above, an object of the present invention is to provide an image processing device, image processing method and program thereof, wherein an embed-image is generated in such a way as to eliminate the possibility that the information for identifying the information block cannot be completely read out, as in the case wherein the information block has been identified but the block number cannot be identified.

Means for Solving the Problems

The objects of the present invention are solved with the following configurations.
1. An image processing device, comprising:
an embed-image generating section configured to divide embed-information into a plurality of information blocks and to generate an embed-image from the plurality of information blocks, the embed-image generating section including:
information pattern generating section configured to generate at least one information pattern from the information block;
an positioning pattern generating section configured to generate at least one positioning pattern for positioning the information pattern, depending on block information about the information block; and
a pattern arranging section configured to arrange the information pattern and the positioning pattern in a predetermined manner.
2. An image processing device, comprising:
an information restoring section configured to restore embed-information from an embed-image in which the embed-information having been divided into a plurality of information blocks is embedded, the information restoring section including:
a pattern extracting section configured to extract from the embed-image a positioning pattern which represents block information related to the information block; and
an embed-image extracting section configured to extract, by using the block information, the embed-information embedded in the embed-image.
3. The image processing device of item 1 or 2, wherein the block information includes a block number of the information block.
4. The image processing device of item 1 or 2, wherein the block information includes a size of a region occupied by the information pattern representing the information block.
5. The image processing device of item 1 or 2, wherein the block information includes a shape of a region occupied by the information pattern representing the information block.
6. The image processing device of item 1 or 2, wherein the block information includes error correction information for the information block.
7. An image processing method, comprising the step of:
generating an embed-image from a plurality of information blocks after dividing embed-information into the plurality of information blocks, the step of generating an embed-image including:
generating at least one information pattern from the information block;
generating at least one positioning pattern for positioning the information pattern, depending on block information about the information block; and
arranging the information pattern and the positioning pattern in a predetermined manner.
8. An image processing method, comprising the step of:
restoring embed-information from an embed-image in which the embed-information having been divided into a plurality of information blocks is embedded, the step of restoring embed-information including:

extracting, from the embed-image, a positioning pattern which represents block information about the information block;

identifying the block information from the extracted positioning pattern; and extracting, by using the block information, the embed-information embedded in the embed-image.

9. A computer program for making a computer execute an image processing method, the image processing method comprising the step of:

generating an embed-image from a plurality of information blocks after dividing embed-information into the plurality of information blocks, the step of generating an embed-image including:

generating at least one information pattern from the information block;

generating at least one positioning pattern for positioning the information pattern, depending on block information about the information block; and arranging the information pattern and the positioning pattern in a predetermined manner.

10. A program for making a computer execute an image processing method, the image processing method comprising the step of:

restoring embed-information from an embed-image in which the embed-information having been divided into a plurality of information blocks is embedded, the step of restoring embed-information including:

extracting, from the embed-image, a positioning pattern which represents block information about the information block;

identifying the block information from the extracted positioning pattern; and extracting, by using the block information, the embed-information embedded in the embed-image.

Advantage of the Invention

The present invention provides an image processing device, image processing method and program thereof wherein the positioning pattern of the information pattern is generated depending on the block information about the information block, thereby eliminating the possibility that the information for identifying the information block cannot be completely read out, and ensuring that, if the information pattern can be identified, the read out information can always be used effectively. The present invention also provides an image processing device, image processing method and program thereof, wherein the positioning pattern of the information pattern is generated depending on the block information, thereby enhancing the embedding efficiency of embed-information.

BRIEF DESCRIPTION OF THE DRAWINGS

FIG. 7 is a diagram showing an example of an method of dividing the embed-information into a plurality of information blocks;

FIG. 8 is a table showing an example of an method of dividing the information block into embed-data unit;

FIG. 10 is a diagram showing an example of a dot pattern table;

FIGS. 17a and 17b are diagrams showing an example of a histogram memory;

FIGS. 18a, 18b, and 18c are diagrams showing an example of assigning a special pattern with a meaning other than the meaning of a block number;

FIG. 19 is a schematic diagram representing an example of a pattern layout chart in a fourth embodiment; and FIG. 20 is a diagram showing an example of a dot pattern table in the fourth embodiment.

NUMERALS

Figure 1:
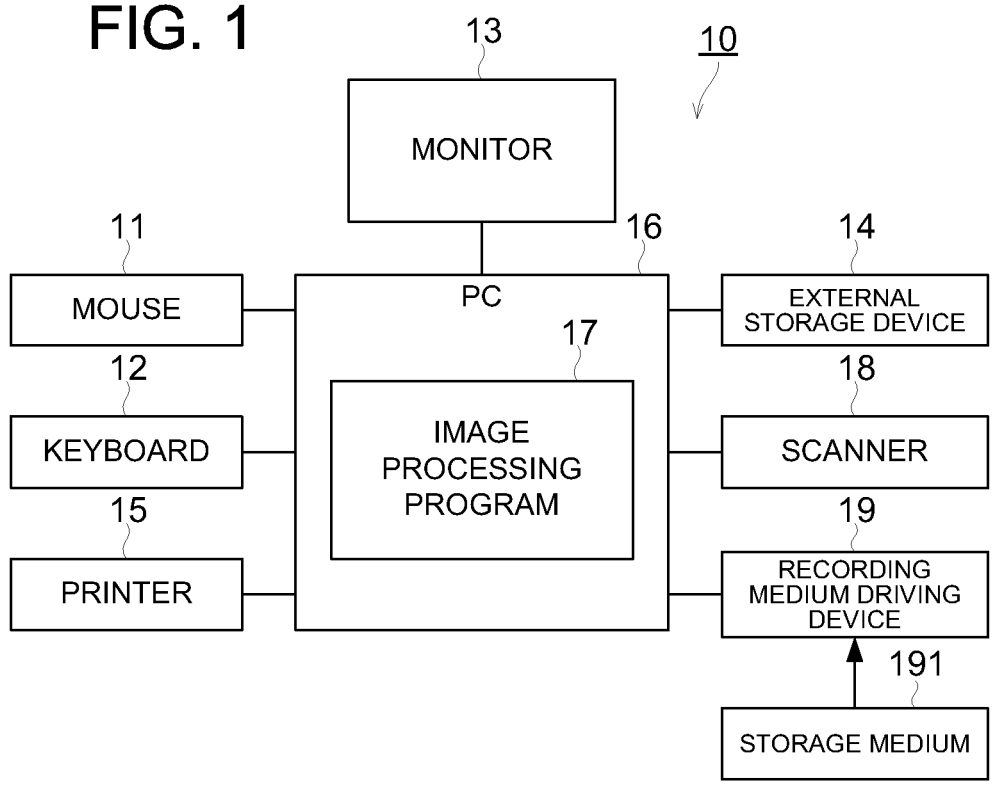
FIG. 1 is a schematic diagram showing an example of a system configuration of an image processing device in an embodiment of the present invention.

10. Image processing device
11. Mouse
12. Keyboard
13. Monitor
14. External storage apparatus
15. Printer
16. Personal computer (PC)
17. Image processing program
18. Scanner
19. Recording medium driving device
191. Storage medium
21. User instruction
22. Image data display
23. Print image
24. Input/output interface
25. CPU/memory
26. Storage device
27. OS (Operating System)
28. Image processing section
29. Scanned image
31. Operation panel section
32. Scanning section
33. Printer section
34. MFP (Multi Functional Peripheral) main unit
35. Image forming circuit
INF Embed-information
BD Embed-image
IM Document image
PD Print image PM Print-matter
IB Information block
EU Embed-data unit
IP Information pattern
DP Dot pattern chart
TB Dot pattern table
SP Special pattern
LO Pattern layout chart
BI Block image
BL Block layout chart
SI Scanned image
HM Histogram memory
RD Reconstruction data

BEST MODE FOR CARRYING OUT THE INVENTION

The following describes the present invention with reference to the illustrated embodiment. It is to be expressly understood, however, that the present invention is not restricted thereto. The same or equivalent portions in the drawing will be assigned with the same reference numerals and will not be described to avoid duplication.

(Schematic Configuration of the Image Processing Device)

In the first place, referring to FIG. 1, the following describes an example of the system configuration of the image processing device in the present embodiment. FIG. 1 is a schematic diagram showing an example of the system configuration of the image processing device in an embodiment of the present invention. It shows the case wherein a personal computer (hereinafter referred to as "PC") is used as an image forming apparatus.

In FIG. 1, the image processing device 10 includes a mouse 11, keyboard 12, monitor 13, external storage apparatus 14, printer 15, PC 16, scanner 18 and recording medium driving device 19.

The PC 16 has the same configuration as the hardware of a computer in common use. The function of the image processing device 10 is realized by the CPU (Central Processing Unit) (FIG. 2) executing an image processing program 17.

The mouse 11 and keyboard 12 are used as input devices, and are used by the user to give various instructions at the time of starting the image forming program 17 and executing the image forming program 17.

The monitor 13 is used to display the document and image file. Referencing the data displayed on the monitor 13, the user gives instructions to the image forming program 17, whereby the image forming process runs.

The external storage apparatus 14 is a hard disk, for example, and is used to store a document and image file. It is also possible to make such arrangements that the image forming program 17 is stored in the external storage apparatus 14 and the PC 16 loads the image forming program 17 into the internal RAM (Random Access Memory) from the external storage apparatus 14, whereby the program is executed.

The printer 15 receives the image data with information embedded therein, and the image with information embedded therein is printed out. The print-image processed by the image processing program 17 is sent to the printer 15 by the PC 16, whereby the image processing operation completed.

The scanner 18 is a document reading device, and is used to read the image of print-matters, photographs, films and others, and to generate image data, which is sent to the PC 16 or to read the information embedded in the print-matter. Such information is then sent to the PC 16.

The recording medium driving device 19 is a driving device for the storage medium 191 of an information recording disk such as a CD-ROM and DVD-ROM, or memory card. The image data obtained through image processing executed by the PC 16 is stored in the recording medium of this recording medium driving device 19. Further, it is also possible to make such an arrangement that the image forming program 17 recorded in the storage medium 191 is loaded into the RAM of the PC 16 through the recording medium driving device 19 so that the program is executed.

Further, the image processing device 10 can have a function for exchanging a document and image file with another PC or Internet via the network interface (not illustrated).

Figure 2:
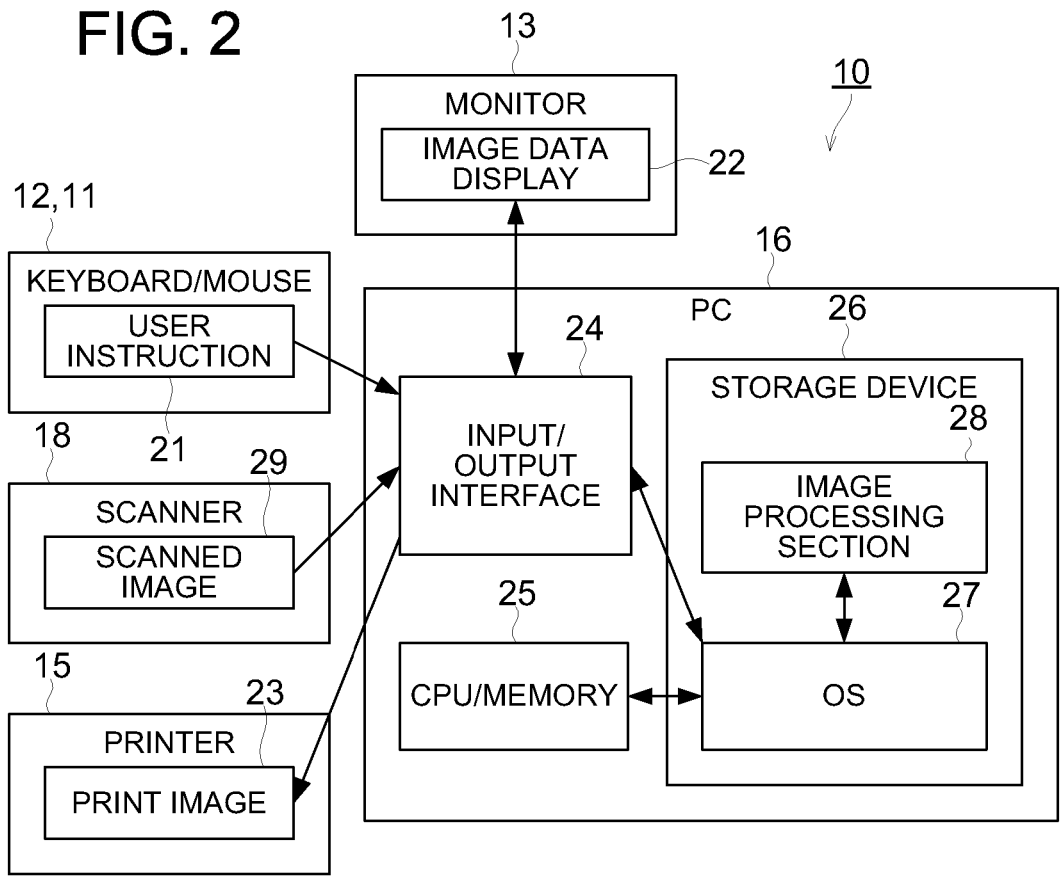
FIG. 2 is a schematic diagram representing the function of the image processing device.

Referring to FIG. 2, the function of the image forming apparatus 10 of FIG. 1 will be described. FIG. 2 is a schematic diagram representing the function of the image forming apparatus 10.

In FIG. 2, the PC 16 includes an input/output interface 24, CPU/memory 25 and storage device 26. The storage device 26 includes the Operating System (OS) 27 and the image forming section 28 realized by the image forming program 17. The image forming program 17 runs on the OS 27 to perform the functions of the image forming section 28. In this case, the PC 16 functions as an embed-image generating section, information pattern generating section, positioning pattern generating section and pattern layout section. It also functions as an information reconstruction section, pattern reading section, block information reading section and embedded information reading section. Further, the image forming program 17 works as a program that makes the computer perform these functions.

The image forming section 28 controls the keyboard 12, mouse 11, monitor 13, printer 15 and scanner 18 by inputting or outputting the data through the OS 27 and input/output interface 24. The image forming section 28 receives the user instruction 21 through the keyboard 12 or mouse 11. The image forming section 28 performs image data display 22 on the monitor 13, sends the processed image data to the printer 15 as the print image 23, and receives the scanned image 29 from the scanner 18, whereby image processing is performed.

Figure 3:
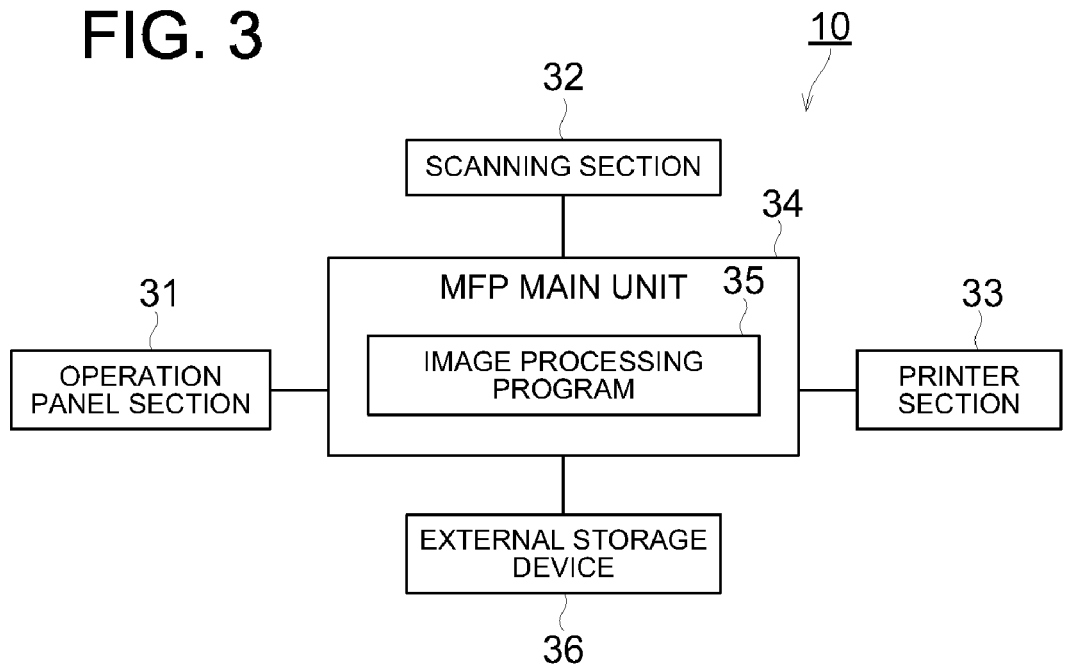
FIG. 3 is a schematic diagram representing another example of the system configuration of the image processing device in an embodiment of the present invention.

Referring to FIG. 3, the following describes another example of the system configuration of the image forming apparatus 10 of the present invention. FIG. 3 is a schematic diagram representing another example of the system configuration of the image forming apparatus 10 of the present invention. It shows the case where an MFP (Multi Functional Peripheral) constitutes the image forming apparatus 10.

In FIG. 3, the image forming apparatus 10 includes an operation panel section 31, scanning section 32, printer section 33, MFP main unit 34 and external storage apparatus 36.

The MFP main unit 34 is comprised of an image forming circuit 35 and others. The image forming circuit 35 receives the user instruction inputted from the operation panel section 31, and performs image processing operations while controlling the scanning section 32 and printer section 33. The image forming circuit 35 performs the same functions as those performed by the image processing program 17 of FIG. 1. The formed image is stored, for example, in the external storage apparatus 36, and is read out and printed out whenever required. Similarly to the case of FIG. 1, the MFP main unit 34 can have a function of exchanging a document and image file with another PC or Internet via the network interface (not illustrated).

Figure 4:
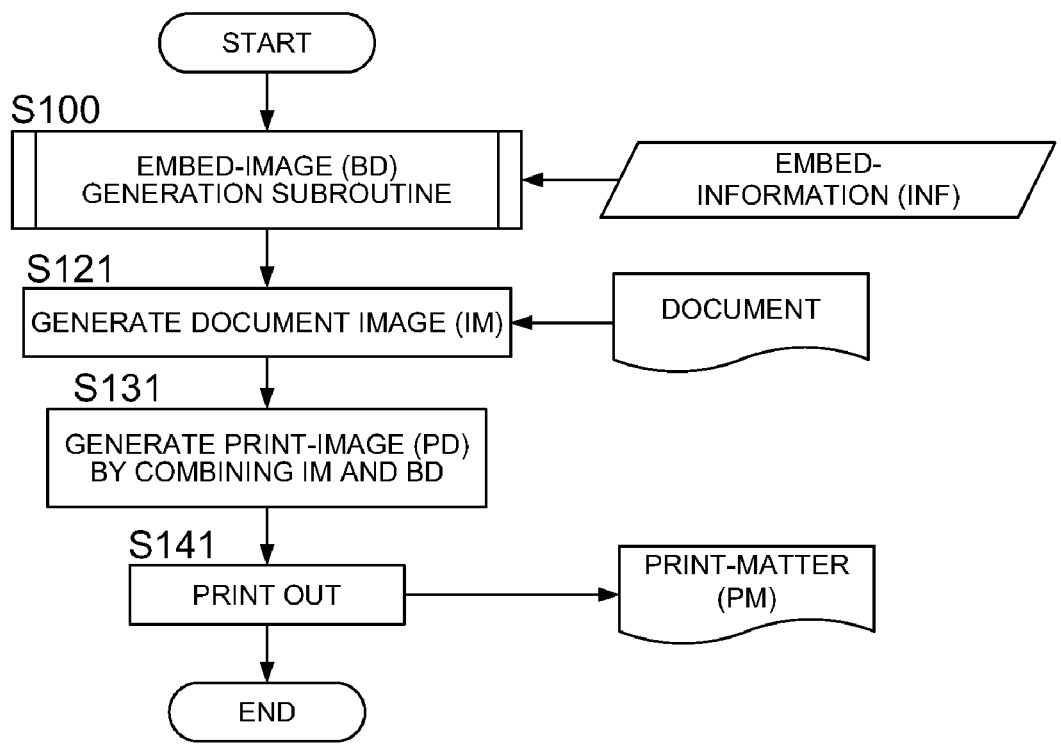
FIG. 4 is a flow chart showing an example of an image processing method implemented in the image processing device.
Figure 5:
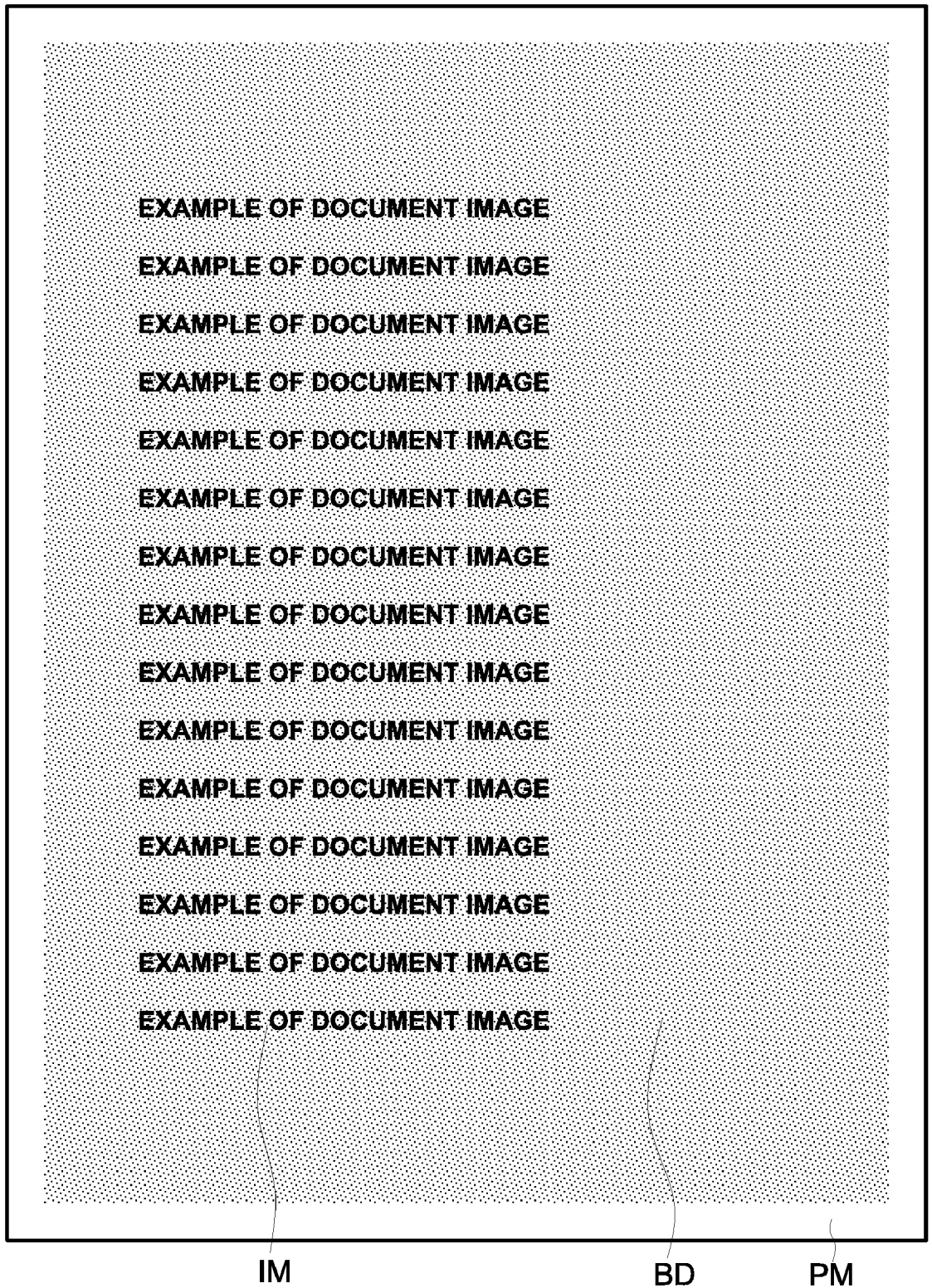
FIG. 5 is a schematic diagram representing an example of the print-matter wherein the document image and embedded image are printed out.

Referring to FIGS. 4 and 5, the following describes the image processing method to be performed by the image forming apparatus 1. FIG. 4 is a flow chart representing an example of the image processing method performed by the image forming apparatus 10.

In FIG. 4, in Step S100 "embed-image (BD) generation subroutine", an embed-image BD is generated from the embed-information INF having been inputted (embed-image generation process). The embed-image (BD) generation method will be described in detail with reference to FIG. 6 and thereafter.

In Step S121, the document and image file stored in the external storage apparatus 14 are read out, the print-matter and photos are read out by the scanner 18, or the document and image are transmitted via the network, whereby the document image IM is generated (document image generation process). In Step S131, the print image PD is generated by superimposition of the embed-image BD generated in Step S100 on the document image IM generated in Step S121 (image superimposition process). In Step S141, the print-image PD is sent to the printer 15, for example, and the print-matter PM is printed out. All steps of the operation are whereby completed.

FIG. 5 is a schematic diagram representing an example of the print-matter PM wherein the document image IM and embedded image with information embedded therein are printed out.

In FIG. 5, together with the document image IM containing the message of "an example of a document image", the embed-image BD generated according to the method described with reference to FIG. 4 is laid out over the entire sheet surface, and is printed out as a gray background of almost uniform density.

Embodiment 1

Referring to FIGS. 6 through 14, the following describes the first embodiment of the present invention.

(Method of Obtaining the Embed-Image BD from the Embed-Information INF)

Figure 6:
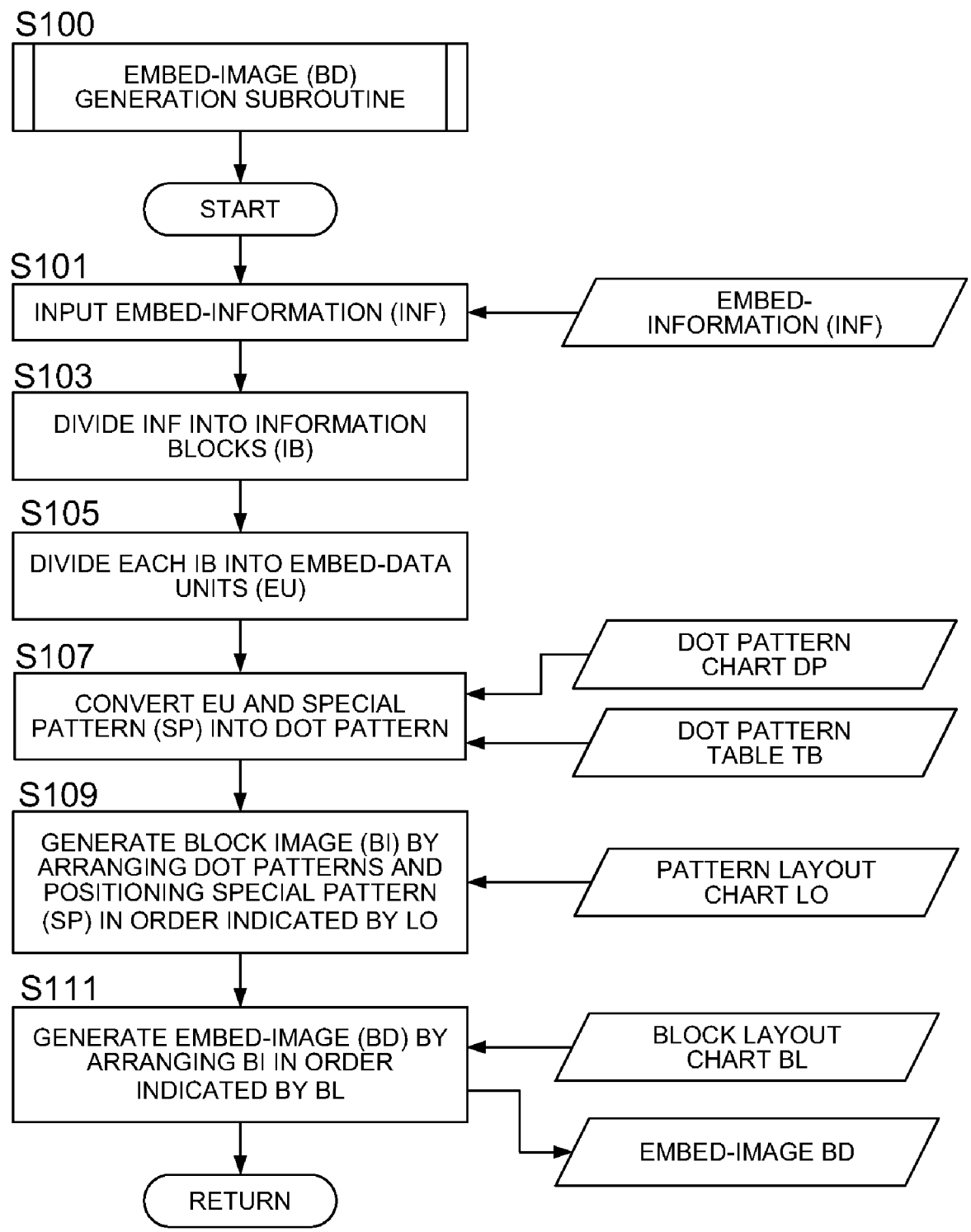
FIG. 6 is a flow chart showing the details of an embed-image generation subroutine in Step S100.

Referring to FIGS. 6 through 14, the following describes "the method of obtaining the embed-image BD from the embed-information INF" described with reference to Step S100 "Embed-image (BD) generation subroutine" in FIG. 4. FIG. 6 is a flow chart showing the details of Step S100 "Embed-image (BD) generation subroutine" in FIG. 4.

In FIG. 6, when the embed-information INF to be embedded has been embedded in Step S101 (embed-information input process), the embed-information INF is divided into a plurality of information blocks IB in Step S103 (information block generation process). Division of the embed-information INF into a plurality of information blocks IB will be described with reference to FIG. 7. In Step S105 (embed-data unit generation process), each of the information blocks IB divided in Step S103 is divided into embed-data units EU. Division of the information block IB into embed-data units EU will be described with reference to FIG. 8.

In Step S107 (information pattern generation process and special pattern generation process), the embed-data units EU divided in Step S105 are subjected to dot patterning for each information block IB, according to the dot pattern chart DP and dot pattern table TB. According to the block number of the information block IB, the special pattern SP as a reference for positioning the information block IB is also subjected to dot patterning. The dot patterning method for the embed-data units EU and special pattern SP will be described with reference to FIGS. 9 through 11. Here the special pattern SP corresponds to the positioning pattern, and the special pattern generation process corresponds to the positioning pattern generation process.

In Step S109 (pattern layout process), the embed-data units EU and special pattern SP having been subjected to dot pat-terning in Step S107 are arranged according to the pattern layout chart LO, whereby a block image BI for each information block IB is generated. The method for generating the block image BI will be described with reference to FIGS. 12 and 13.

In Step S111 (block image layout process), the block images BI of the information blocks IB generated in Step S109 are arranged according to the block layout chart BL, and the embed-image BD is generated. Then the operation goes back to Step S100. The method of generating the embed-image BD will be described with reference to FIG. 14.

Referring to FIG. 7, the following describes the division of the embed-information INF into a plurality of information blocks IB. FIG. 7 is a diagram showing an example of the method of dividing the embed-information INF into a plurality of information blocks IB.

In FIG. 7, assume that the embed-information INF is made of 600-bit data, for example. This is divided, for example, into five information blocks IB (first information block IB1 through the fifth information block IB5) for every 120 bits. The numeric row, of 0s and 1s, affixed to each information block IB of FIG. 7 indicates 120-bit data.

Referring to FIG. 8, the following describes the division of the information block IB into embed-data units EU. FIG. 8 is a table showing an example of the method of dividing the information block IB into embed-data units EU. Here an example is taken from the second information block IB2 of FIG. 7, for the purpose of explanation.

In FIG. 8, assume that the 120-bit data of the aforementioned second information block IB2 is divided into 24 patterns of embed-data unit EU, for example, in units of five bits. The first five bits are, for example, "01110" corresponding to decimal "14". This is the embed-data unit EU of the first pattern. The five bits of the second pattern are, for example, "10100", corresponding to decimal "20". In this manner, the 120-bit data is divided into the embed-data units EU as 24 patterns of 5 bits. The same procedure also applies to other information blocks IB, and 120-bit data is divided into embed-data units EU of 24 patterns of 5-bit data units.

Figure 9:
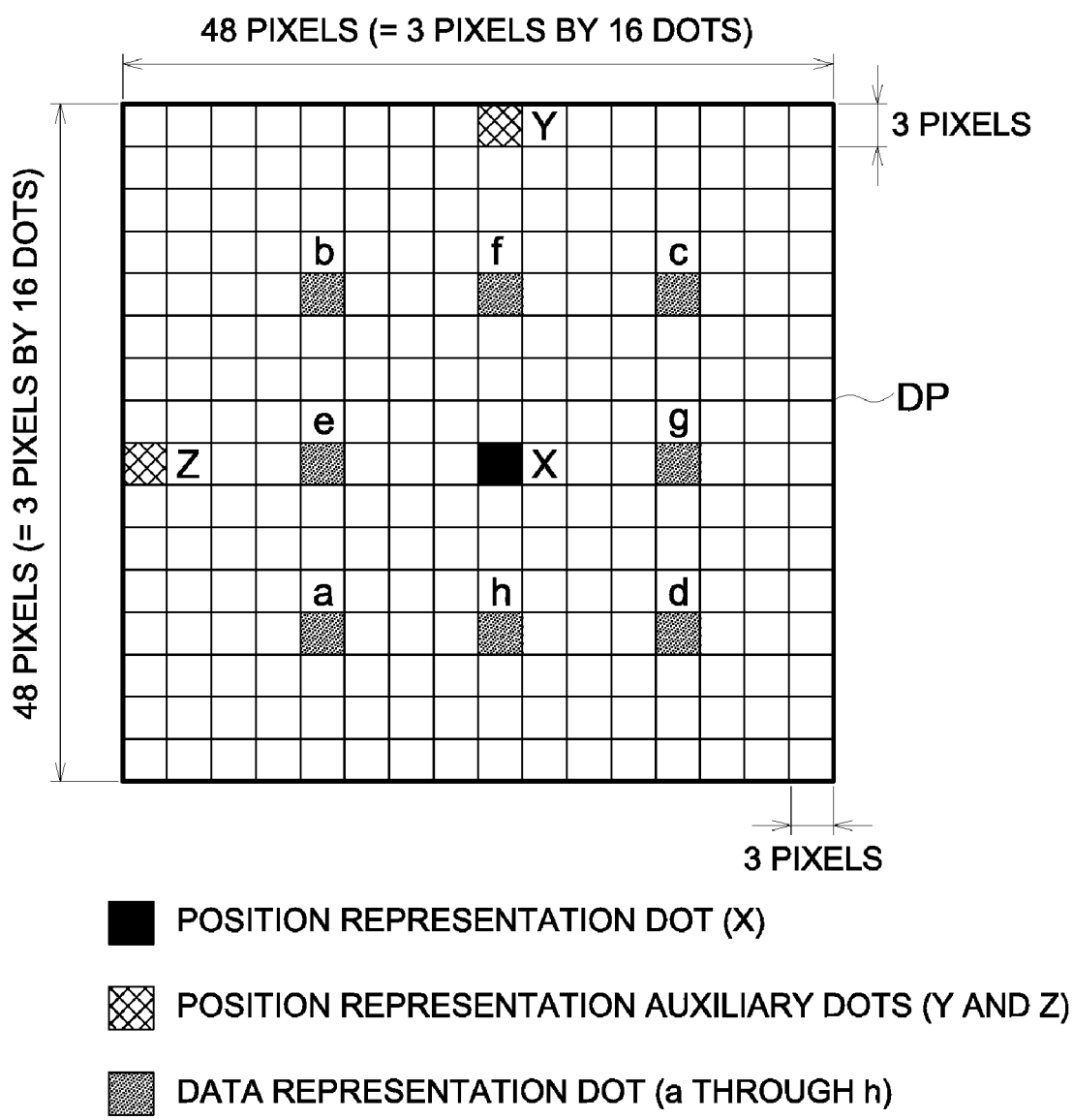
FIG. 9 is a schematic diagram representing an example of a dot pattern chart.
Figures 11, 12:
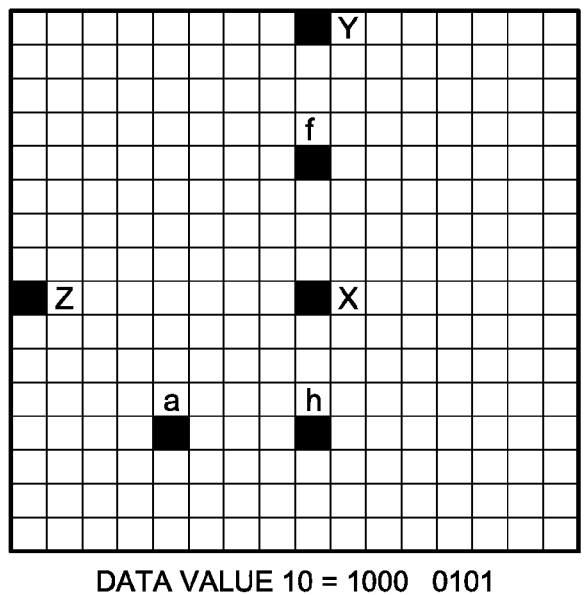
FIG. 11 is a diagram showing an example of representing an information pattern using a dot pattern.
FIG. 12 is a schematic diagram representing an example of a pattern layout chart.

Referring to FIGS. 9 through 11, the following describes the dot patterning of the embed-data units EU and special pattern SP. FIG. 9 is a schematic diagram representing an example of the dot pattern chart DP. Here a lattice structure is used to represent the dot pattern corresponding to a 5-bit embed-data unit EU shown in FIG. 8.

In FIG. 9, one square cell of the dot pattern chart DP indicates the position for one dot. One dot has a 3-by-3 pixel size for printing. To put it another way, one dot is formed by 3-by-3 pixel printing. The dot pattern corresponding to one piece of embed-data unit EU is formed by 16 square cells in both the horizontal and vertical directions; namely, it is composed of 48 pixels by 48 pixels.

The black square cell (dot X) at the center shown in FIG. 9 is a position representation dot, and is always provided in all dot patterns to provide a reference for positioning the dot pattern and for reading. Further, the hatched dots on the upper center (dot Y) and left center (dot Z) are auxiliary dots for representing the position, and are always provided in all the dot patterns as a reference for detecting the position representation dot (dot X) at the time of reading.

In the gray dot in FIG. 9, a dot is provided or not provided depending on the value of the embed-data unit EU. Namely, the gray dot is an information dot, and the data value is represented by an on-off status of this dot. In the example of FIG. 8, there are eight information dots from "a" to "h". The information of eight bits can be expressed at the most. In the following description, the dotted square cell will be called an on-dot, and the un-dotted square cell will be called an off-dot.

FIG. 10 is a diagram showing an example of the dot pattern table TB. Here the embed-data unit EU of five bits shown in FIG. 8 and the special positioning pattern SP as a reference for the pattern layout chart LO (to be described later) are expressed using the information of three positions out of the information at eight positions "a" through "h" shown in FIG. 9, namely, three bits out of eight bits.

There are prepared special patterns SP of the same number as the information blocks IB, and they are assigned with the role of position reference for the block image BI representing the information block IB as well as the meaning of the block number. To be more specific, five kinds of special patterns SP from the first special pattern SP1 to the fifth special pattern SP5 are prepared as the special patterns SP, and are used as the special patterns showing the first information block IB1 to the fifth information block IB5 given in FIG. 7, respectively. In the following description, the embed-data unit EU and special pattern SP shown in FIG. 10 are represented as a dot pattern using the position representation dot (dot X) at one position in FIG. 9, the position representation auxiliary dots (dots Y and Z) at two positions, and the information dots at three out of eight positions. This pattern will be called the information pattern IP.

In FIG. 10, the information dot is expressed by "0" and "1" of eight bits, which are in the order of the positions "abcdefgh" of the information dots. "1" denotes an on-dot, and "0" indicates an off-dot. For example, the information dot corresponding to the decimal data "10" of the embed-data unit EU is "10000101". Thus, "a", "f" and "h" at three positions out of information dots at eight positions are on-dots, and the dots at all other positions are off-dots. The position representation dot (dot X) and position representation auxiliary dots (dots Y and Z) are always on-dots, and are not described in FIG. 10.

FIG. 11 shows an example wherein the information pattern IP corresponding to the data "10" of the decimal number is expressed using the dot pattern chart DP of FIG. 9. As will be apparent from FIG. 11, the position representation dot (dot X), position representation auxiliary dots (dots Y and Z), and three positions "a", "f" and "h" out of information eight dots are on-dots. All the other positions are off-dots. Similarly, the twenty-four pieces of embed-data units EU shown in FIG. 8 are converted into information patterns IP.

In the example of FIG. 10, the number of information on-dots is always three. This is intended to ensure that one information pattern IP is always expressed by dots at six positions including the aforementioned position representation dot (dot X), position representation auxiliary dots (dots Y and Z), whereby the density of all the information patterns IP is made uniform so as to get an embed-image BD of uniform density.

Figure 13:
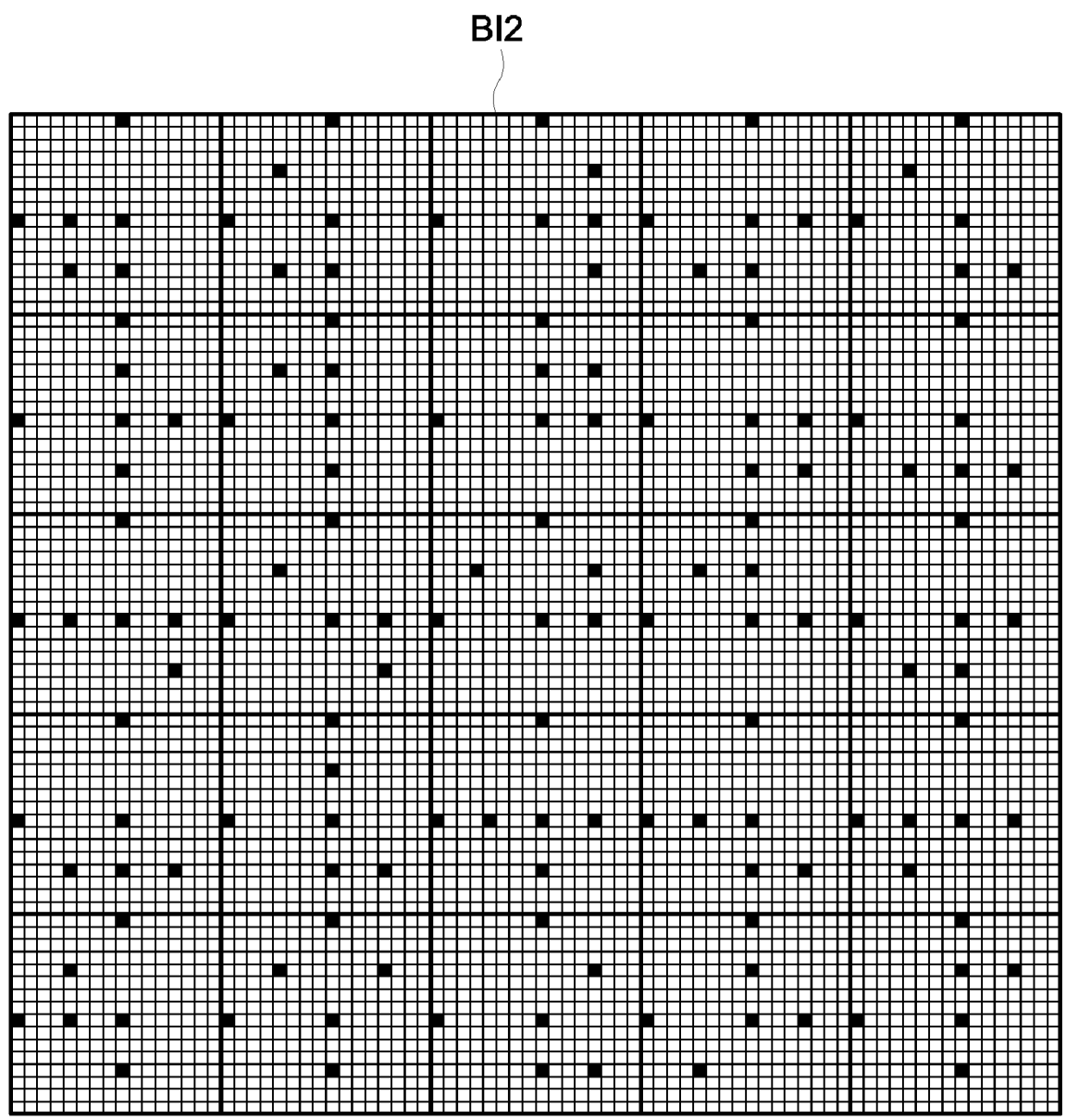
FIG. 13 is a diagram showing an example of a second block image.

Referring to FIGS. 12 and 13, the following describes the method of generating the block image BI. FIG. 12 is a schematic diagram representing an example of the pattern layout chart LO. Here, the second information block IB2 shown in FIGS. 7 and 8 will be again taken as an example for the purpose of explanation.

In FIG. 12, twenty-four information patterns IP of the second information block IB2 shown in FIG. 8, and the second special positioning patterns SP2 indicating the second information block given in FIG. 10 are arranged at the 25 positions (5-by-5 pattern positions). The first five bits shown in FIG. 8, i.e., the information pattern IP as the first pattern information corresponding to decimal "14" is arranged at the upper left position 101. The next five bits, i.e., the information pattern IP of the second pattern corresponding to decimal "20" is arranged at the position 102 adjacent to the first pattern on the right side. The other information patterns IP will be arranged in the same manner.

The second special pattern SP2 indicating the second information block IB2 is arranged at the center position 125 of the 5-by-5 pattern arrangement. The 5-by-5 pattern image generated in the aforementioned procedure is the second block image BI2 as the embed-image of the second information block IB2. The aforementioned procedure applies to the other information blocks IB (IB1 through IB5), whereby information blocks BI (IB1 through IB5) are generated.

FIG. 13 is a diagram showing an example of the second block image BI2. The lattice inside the information pattern IP and the boundaries between the information patterns IP are indicated in order to give a clear understanding of the mutual arrangement of 25 information patterns IP and the dot position inside each information pattern IP. However, only the on-dots are actually printed as the embed-image BD.

As shown in FIG. 9, in this example, one information pattern IP corresponds to an area of 48-by-48 pixels. Thus, the area of each block image BI contains 240-by-240 pixels.

For example, when one pixel is printed at a resolution of 600 dpi, one dot is about 130 μm square, and one information pattern IP is about 2 mm square. The block image BI shown in FIG. 13 is about 10 mm square.

Figure 14:
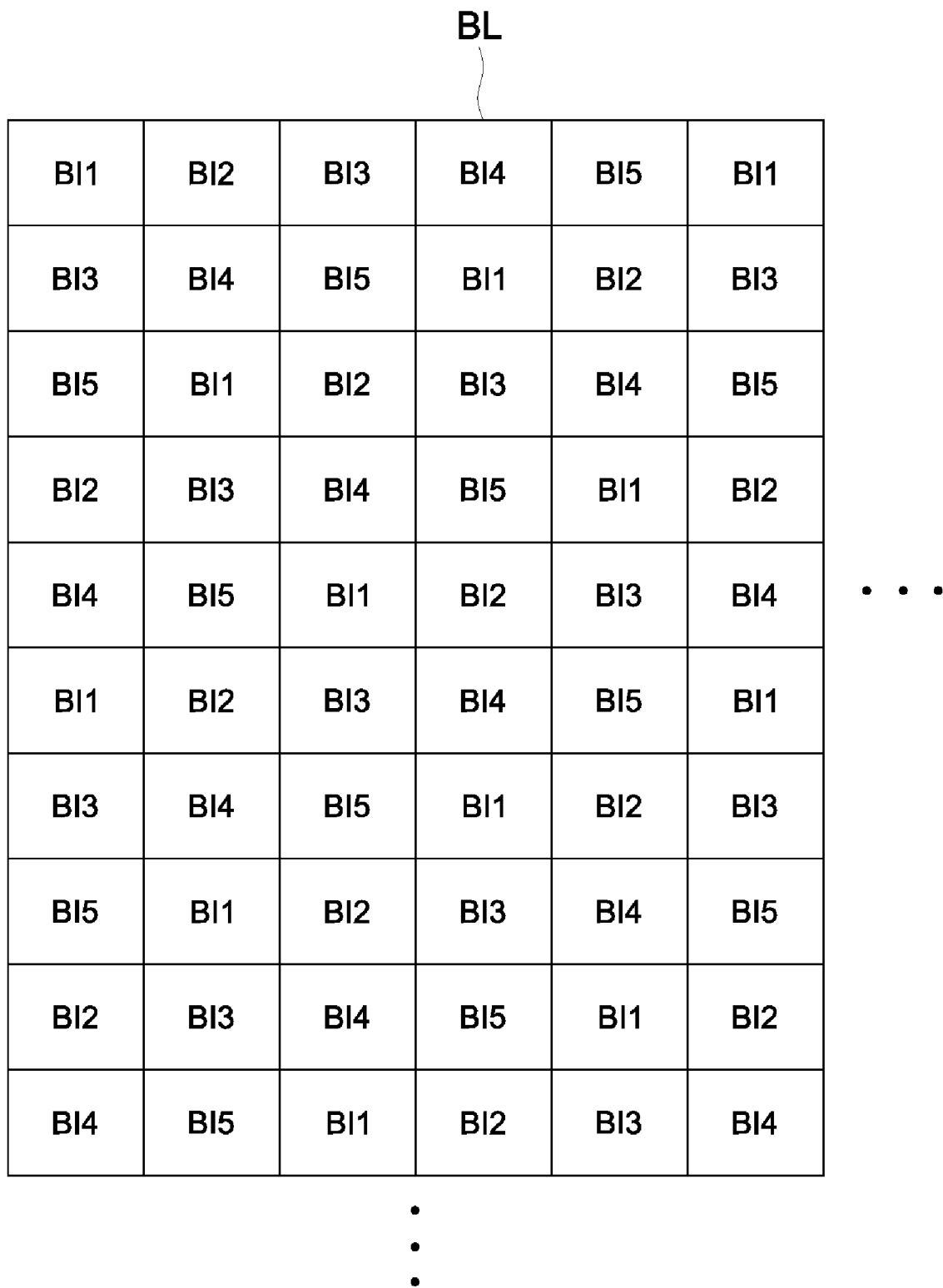
FIG. 14 is a diagram showing an example of a block layout chart.

The following describes the method of generating an embed-image BD with reference to FIG. 14. FIG. 14 is a diagram showing an example of the block layout chart BL described with reference to FIG. 6.

In FIG. 14, the block images (BI1 through BI5) of the information blocks (IB1 through IB5) are laid out sequentially according to the block layout rule. This example uses the block layout rule shown below, without the present invention being restricted thereto, and it goes without saying that other rules can be utilized.

(Horizontal Rule)

Get a remainder of the block number (1 through 5), of a block image BI in one place, plus 1 divided by 5, and place a block image BI whose block number is the same as the remainder in the right side.

(Vertical Rule)

Get a remainder of the block number (1 through 5), of a block image BI in one place, plus 2 divided by 5 and place a block image BI whose block number is the same as the remainder on the lower side.

In both the horizontal and vertical directions, if the remainder is "0", the block number is assigned with "5".

As described above, the embed-image BD can be obtained by arranging the block image BI1s through BI5 in a certain manner. In the first embodiment, the information block IB is represented by a plurality of information patterns IP, without the present invention being restricted thereto, however, an information block IB can be composed of an information pattern IP. In this case, the block image BI is identical with the information pattern IP.

As described above, in the first embodiment, the special patterns SP located at the center of the block image BI of the information block IB and serving as a position reference for the layout of each information pattern IP inside the block image BI are prepared in the same numbers as that of the information block IB. The special pattern SP is used not only to provide a positional reference for the block image BI, but also to indicate a block number. When the embed-image BD is to be read, this arrangement ensures that, if the special pattern SP only can be read out, not only the area of the block image BI to which the special pattern SP belongs but also the block number of the information block IB can be detected.

Thus, this arrangement allows an embed-image to be generated without the possibility of such a case that the information for identifying the information block cannot be entirely read out with the information block having been identified but with the block number having not been identified.

Further, in the example shown in FIG. 3 of the aforementioned "Patent Literature 2", a total of 76 image patterns—60 image patterns on the periphery and 16 image patterns in the address code portion (block number portion)—are used as area information containing 256 image patterns (16×16) in one block. Thus, the ratio of area information to the block is 76/256=about 30 percent. This accounts for a very large area.

In the meantime, in the first embodiment, the ratio of the special pattern SP corresponding to the aforementioned area information of the block image BI is 1/25=4 percent. This accounts for only a small area corresponding to less than 1/7 of that in "Patent Literature 2". This denotes a high probability that the special pattern SP can also be read out from the narrow embed-image BD, and provides an embedding method characterized by excellent information detection performance. Further, the lower ratio of the special pattern SP allows the block image to contain a greater amount of embed-information in the block image BI. This can be said to provide an embedding method characterized by excellent information embedding efficiency.

Embodiment 2

Figure 15:
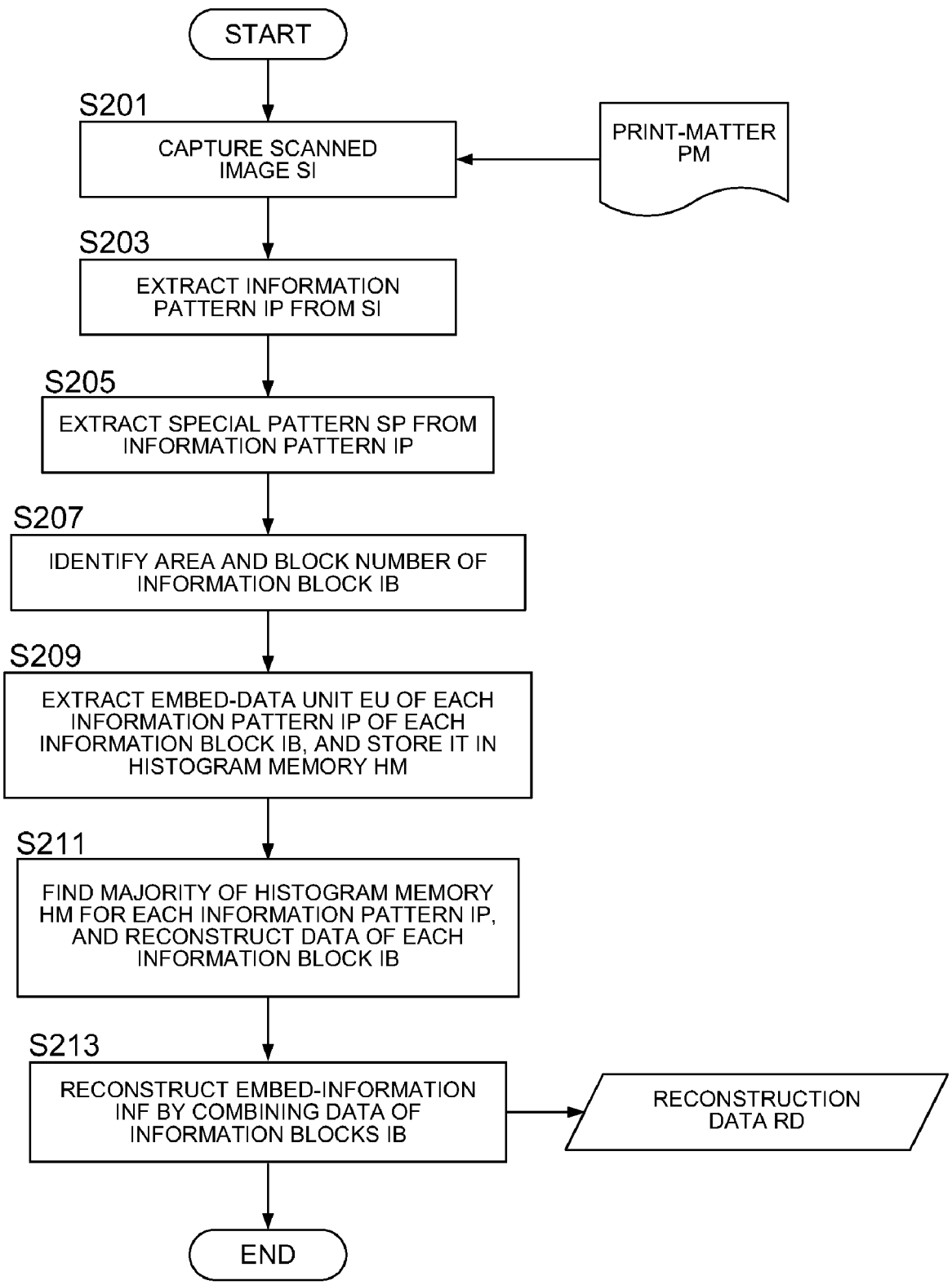
FIG. 15 is a flow chart showing the method of reading embedded information from a embedded image.

The second embodiment of the present invention will be described with reference to FIGS. 15 through 17. In the first place, the following describes the method of reading the embedded information from the embed-image BD generated by the method described with reference to the first embodiment and printed on the print-matter PM. FIG. 15 is a flow chart showing the method of reading the embedded information from the embed-image BD. It shows an information reconstruction process.

In FIG. 15, in Step S201 (scanned image capturing process), for example, the print-matter PM with an embed-image BD printed thereon is scanned by a scanner and the scanned image SI is captured by the image processing device 10. Assume, for example, that the print-matter PM has been printed out at a resolution of 600 dpi, and scanning has been performed at a resolution of 200 dpi so that one dot (3-by-3 pixels) will correspond to one pixel. If the print-matter PM is inclined, the inclination can be adjusted according to the method proposed by the applicant of the present invention in Japanese Unexamined Patent Application Publication No. 2006-222878, for example.

In Step S203, the information pattern IP is read out from the scanned image SI. To be more specific, the position representation dot (dot X) as a reference for each information pattern shown in FIG. 9 is detected according to the method proposed by the applicant of the present invention in Japanese Unexamined Patent Application Publication No. 2006-324909, for example, using the filter shown in FIG. 34 of this Japanese Unexamined Patent Application Publication. The eight information dots (a through h) are found out from the position of the position representation dot (dot X) having been detected. Then a step is taken to detect the position where the information dot is placed, and the information pattern IP is read out. This procedure is applied to all the scanned images SI in order to extract all the information patterns that can be extracted.

In Step S205 (pattern extraction process), the special patterns SP (SP1 through SP5) are extracted from all the information patterns IP having been extracted in Step S203. In Step S207 (block information identification process), the area of the block image BI representing the information block IB and the block number are identified from the special patterns SP extracted in Step S205. For example, when the second special pattern SP2 as a special pattern of the second information block IB2 has been extracted, the 5-by-5 pattern range centering on the second special pattern SP2 having been extracted is determined as the second information block IB2.

Figure 16:
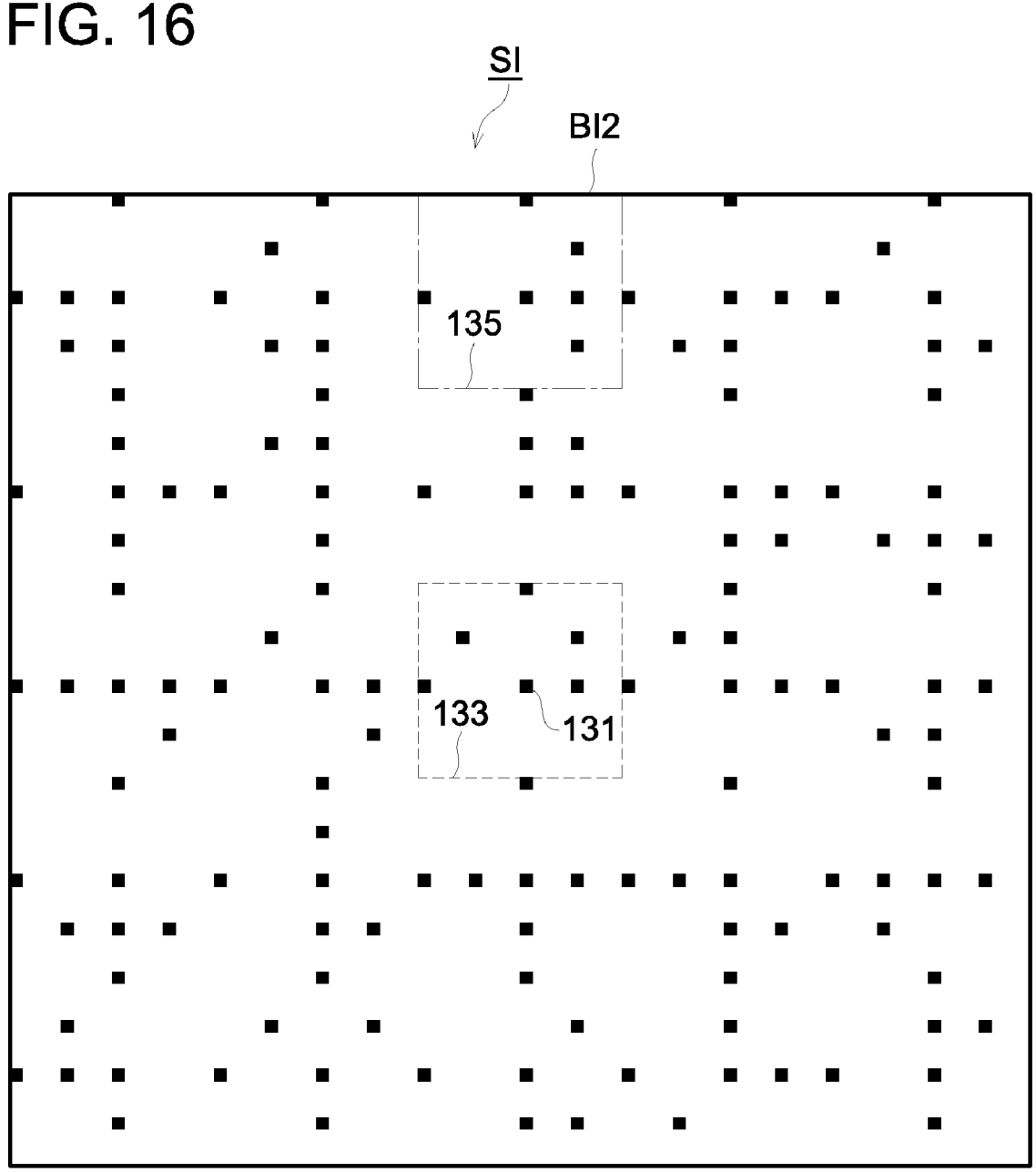
FIG. 16 is a diagram showing an example of a scanned image.

An example of the scanned image SI is given in FIG. 16. FIG. 16 is a diagram showing an example of the scanned image SI. The dot 131 in FIG. 16 is the position representation dot (dot X) having been detected in Step S203. This shows that the 16-by-16 dot area 133 centering on the dot 131 and enclosed in a square defined by the broken line of FIG. 16 is one information pattern IP. Further, the embedded information is shown to be (01100010) by matching the position of the information dot in the area 133 to the position of the information dot of FIG. 9. Thus, FIG. 10 indicates that the area 133 is the second special pattern SP2.

The area 133 i.e., a 5-by-5 pattern area (indicated by the solid square in FIG. 16) centering on the second special pattern SP2 is identified as the second block image BI2 representing the second information block IB2. This is followed by the step for sequentially reading the information embedded in each information pattern inside the identified second block image BI2. For example, the information pattern 135, located two positions above the second special pattern SP2, enclosed by a one-dot chain line in the diagram is a third pattern, and the information dot thereof is (00110010), i.e., decimal "30" from FIG. 10.

Going back to FIG. 15, the embed-data units EU indicated by the information patterns IP inside the block image BI identified in Step S207 is extracted in Step S209, and "1" is added to the data value, of the histogram memory HM (to be described in detail with reference to FIGS. 17a and 17b, corresponding to the read out embed-data unit EU). The same procedure is applied to the embed-data units EU, indicated by all the information patterns IP, read out in Step S203, whereby the histogram of the embed-data units EU of 24 information patterns IP for each block image BI is extracted.

In Step S211, the embed-data units EU indicated by the information patterns IP of each block image BI are determined under majority rule according to the histogram extracted in Step S209. The pieces of embed-data units EU from the first pattern to the 24th pattern are connected in order, and the 120-bit data of each information block IB is reconstructed. Steps S209 and S211 indicate an embedded information extraction process.

Lastly, in Step S213 (embedded information reconstruction process), the pieces of the data of the first through fifth blocks are connected, and the reconstruction data RD of the embed-information INF is generated.

An example of the histogram memory HM is given in FIGS. 17a and 17b. FIGS. 17a and 17b are diagrams showing an example of the histogram memory HM. FIG. 17a indicates the status of the histogram memory HM in the initial phase of the operation in Step S209. FIG. 17b shows the status of the histogram memory HM in the final phase of the operation in Step S209.

In FIG. 17a, a histogram memory HM is created for each information block IB. Each of the information patterns IP from the first information pattern to the 24th information pattern is provided with the counter range from "0" to "31" corresponding to the embed-data units. For example, the embed-data unit of the third pattern of the second information block IB2 is extracted and is determined as (00110010), i.e., decimal "30" from FIG. 10. In this case, "1" is added to the counter area 30 for the third pattern of the histogram memory HM. Similarly, when the result of reading the embed-data unit of the fourth pattern has been determined as (10000011), i.e., decimal "5", "1" is added to the counter range 5 for the fourth pattern of the histogram memory HM.

In the manner described above, a histogram memory HM for the embed-data unit EU of each information pattern IP is created for each block image BI representing each information block IB from the information embedded in all the information patterns IP extracted from all the scanned images SI. The information pattern IP of each information block IB is determined from the histogram.

FIG. 17*b* is a diagram representing the created histogram of the second information block IB2. Assume, for example, that the third pattern is extracted to be decimal "3" once, and is extracted to be "30" 86 times. Depending on this result, the third pattern is determined as decimal "30" under majority rule. Similarly, the fourth pattern is determined as decimal "5" under majority rule. In this way, the values of the information patterns IP of each information block IB are determined, and those information patterns IP are connected each other to reconstruct each information block IB.

As described above, according to the second embodiment, a scanned image SI is obtained by scanning by the scanner the document image IM printed with the embed-image BD generated according to the method described with reference to the first embodiment, and a special pattern SP is extracted from the scanned image SI. As described with reference to the first embodiment, the special pattern SP has a function of the position reference for the block image BI representing the information block IB and has information of the block number. If the special pattern SP only can be read out, both the area of the block image BI to which the special pattern SP thereof belongs, and the block number can be detected.

Thus, the second embodiment ensures high-precision reconstruction of the embed-information without the possibility that the position of the information block is identified but the block number is not identified.

Further, the ratio of the special pattern SP to the block image BI is 1/25=4 percent, which means that only a small area is used for the special pattern. Therefore, there is high probability that the special pattern SP can be extracted from the narrow portion of an embed-image BD, and the performance in detection is excellent. If the special pattern SP only can be extracted, the detected portion can be used to reconstruct the information block IB, even if the block image BI is hidden behind the document image IM. This ensures high-precision reconstruction of the embed-information.

Embodiment 3

Referring to FIGS. 18*a*, a8*b*, and 18*c*, the following describes a third embodiment of the present invention. In the first and second embodiments, a plurality of special patterns SP are assigned with a function of the position reference for the block image BI representing the information block IB, and information of the block number. However, the special pattern SP can be assigned with another meaning instead of the information of the block number. FIGS. 18*a*, 18*b*, and 18*c* are diagrams showing an example of assigning a special pattern with information other than the information of a block number. FIG. 18*a* shows the special pattern assigned with a block size, FIG. 18*b* indicates the special pattern assigned with permission or prohibition of using error correction, and FIG. 18*c* depicts the special pattern assigned with both the block size and permission or prohibition of use of error correction.

In FIG. 18*a*, three types of special patterns SP (first special pattern SP1, second special pattern SP2 and third special pattern SP3) are prepared, and each of the special patterns SP is assigned with the different block sizes (e.g., three sizes of 5×5, 7×7, 9×9) in the block image BI representing the information block IB. This arrangement allows the size of the information block IB to be selected depending on the data length of the embed-information. This provides an information block IB that is more flexible than those in the first or second embodiment where the block size is fixed (at 5 by 5).

It goes without saying that it is possible to arrange a special pattern SP conforming to the shape of the block such as a square or hexagonal block image BI instead of the block size, for example.

In FIG. 18*b*, two types of special patterns SP (first special pattern SP1 and second special pattern SP2) are prepared, and each of these special patterns SP is assigned with the information on whether error correction is to be used or not when information is embedded. Here the error correction to be used when information is embedded can be exemplified by the error correction using a humming code. An appropriate error correction can be used in conformity to the detection precision required for the embed-information.

FIG. 18*c* shows an example where a combination of the aforementioned size and permission or prohibition of using error correction is assigned to six types of special patterns SP (first special pattern SP1, second special pattern SP2, third special pattern SP3, fourth special pattern SP4, fifth special pattern SP5 and sixth special pattern SP6). As described, the special pattern SP can be assigned with a plurality of items.

Embodiment 4

The following describes the fourth embodiment with reference to FIGS. 19 and 20. In the first and second embodiments, one special pattern SP is arranged for each block image BI representing the information block IB. However, a plurality of special patterns SP can be arranged for each block image BI representing the information block IB. Here the case of arranging two special patterns SP for one block image BI will be used as an example to describe the method of arranging a plurality of special patterns SP.

In the first place, the following describes the embed-information INF in the fourth embodiment. In the fourth embodiment, unlike the case of FIG. 7, the embed-information INF is assumed to be made of 575-bit data. This is divided into five information blocks IB (first information block IB1, second information block IB2, third information block IB3, fourth information block IB4 and fifth information block IB5), for example, for each of the 115 bits. One information block is divided into 23 information patterns (first pattern through 23rd pattern) for each of the five bits.

FIG. 19 is a schematic diagram representing an example of the pattern layout chart LO in the fourth embodiment. In FIG. 19, the first through sixth patterns are arranged in the same manner as in FIG. 12. A special pattern left-top-SPL is arranged in the position where the 7th pattern is arranged in FIG. 12. The 7th through 11th patterns are arranged in the positions of 8th through 12th patterns in FIG. 12. The 12th pattern is arranged in the position of the special pattern SP of FIG. 12.

The 13th through 17th patterns are arranged in the same manner as in FIG. 12, and a special pattern right-bottom-SPR is arranged in the position where the 18th special pattern SP is arranged in FIG. 12. The 18th through 23rd patterns are arranged in the positions where the 19th through 24th patterns are arranged in FIG. 12. In this manner, the block image BI representing the information block IB is generated.

FIG. 20 is a diagram showing an example of the dot pattern table TB in the fourth embodiment. In FIG. 20, 32 information dots representing 5-bit embed-data units EU are the same as those in the example of FIG. 10.

In addition, there are provided a first special pattern left-top-SPL1 and a first special pattern right-top-SPR1 serving as the position reference and block number of the first block image BI1 representing the first information block IB1; a second special pattern left-top-SPL2 and a second special pattern right-top SPR2 serving as the position reference and block number of the second block image BI2 representing the second information block IB2; a third special pattern left-top-SPL3 and a third special pattern right-top-SPR3 serving as the position reference and block number of the third block image BI3 representing the third information block IB3; a fourth special pattern left-top-SPL4 and a fourth special pattern right-top-SPR4 serving as the position reference and block number of the fourth block image BI4 representing the fourth information block IB4; and a fifth special pattern left-top-SPL5 and a fifth special pattern right-top-SPR5 serving as the position reference and block number of the fifth block image BI5 representing the fifth information block IB5.

These information dots are represented by three of the eight information dot positions so as to make the same dot patterns identical in density.

The information patterns IP generated by the dot pattern table TB shown in FIG. 20 are arranged according to the pattern layout chart LO shown in FIG. 19. This arrangement generates an embed-image BD where a block image BI representing one information block IB is assigned with two special patterns SP.

As described above, according to the fourth embodiment, a block image BI representing one information block IB is assigned with two special patterns SP. This arrangement ensures that, when the information pattern IP is read out from the embed-image BD, if one of the two special patterns SP only can be detected, the range and block number of the block image BI representing the information block IB can be determined.

Thus, as compared to the first and second embodiments where one special pattern SP is arranged for each block image BI representing one information block IB, the present embodiment ensures that, even if there is a partially missing block image BI masked by a document image IM, there is a higher probability that the information embedded in non-missing portions can be taken out, and the embedded information can be extracted with higher precision. Further, even in this case, the ratio of the special pattern SP to the block image BI is $2/25=8$ percent. This means that only a small area is used, and this embedding method is characterized by high information embedding efficiency.

As described above, the present embodiment provides an image processing device, image processing method and program thereof, wherein the positioning pattern of an information pattern can be generated in accordance with the block information of an information block. This arrangement eliminates the problem that the information for identifying the information block cannot be extracted. If an information pattern is only identified, the extracted information can be used effectively. Moreover, since the positioning information of an information pattern is generated according to the block information, the present embodiment provides an image processing device, image processing method and program thereof characterized by high information embedding efficiency.

It is to be expressly understood that the detailed structures and detailed operations of the components constituting the image processing device, image processing method and program thereof can be modified as appropriate, without departing from the technological spirit and scope of the present invention.

The invention claimed is:

1. An image processing device, comprising:
an embed-image generating section configured to divide embed-information into a plurality of information blocks and to generate an embed-image from the plurality of information blocks, the embed-image generating section including:
information pattern generating section configured to generate at least one information pattern from at least one of the information blocks;
an positioning pattern generating section configured to generate at least one positioning pattern for positioning the information pattern, depending on block information about at least one of the information blocks; and
a pattern arranging section configured to arrange the information pattern and the positioning pattern in a predetermined manner.

2. An image processing device, comprising:
an information restoring section configured to restore embed-information from an embed-image in which the embed-information having been divided into a plurality of information blocks is embedded, the information restoring section including:
a pattern extracting section configured to extract from the embed-image a positioning pattern which represents block information related at least one of to the information blocks; and
an embed-image extracting section configured to extract, by using the block information, the embed-information embedded in the embed-image.

3. The image processing device of claim 1, wherein the block information includes a block number of the information block.

4. The image processing device of claim 1, wherein the block information includes a size of a region occupied by the information pattern representing the information block.

5. The image processing device of claim 1, wherein the block information includes a shape of a region occupied by the information pattern representing the information block.

6. The image processing device of claim 1, wherein the block information includes error correction information for the information block.

7. An image processing method, comprising the step of:
generating an embed-image from a plurality of information blocks after dividing embed-information into the plurality of information blocks, the step of generating an embed-image including:
generating at least one information pattern from at least one of the information blocks;
generating at least one positioning pattern for positioning the information pattern, depending on block information about at least one of the information blocks; and
arranging the information pattern and the positioning pattern in a predetermined manner.

8. An image processing method, comprising the step of:
restoring embed-information from an embed-image in which the embed-information having been divided into a plurality of information blocks is embedded, the step of restoring embed-information including:

extracting, from the embed-image, a positioning pattern which represents block information about at least one of the information blocks;

identifying the block information from the extracted positioning pattern; and extracting, by using the block information, the embed-information embedded in the embed-image.

9. A non-transitory computer readable medium storing a computer program for making a computer execute an image processing method, the image processing method comprising the step of:

generating an embed-image from a plurality of information blocks after dividing embed-information into the plurality of information blocks, the step of generating an embed-image including:

generating at least one information pattern from at least one of the information blocks;

generating at least one positioning pattern for positioning the information pattern, depending on block information about at least one of the information blocks; and arranging the information pattern and the positioning pattern in a predetermined manner.

10. A non-transitory computer readable medium storing a program for making a computer execute an image processing method, the image processing method comprising the step of: restoring embed-information from an embed-image in which the embed-information having been divided into a plurality of information blocks is embedded, the step of restoring embed-information including:

extracting, from the embed-image, a positioning pattern which represents block information about at least one of the information blocks;

identifying the block information from the extracted positioning pattern; and extracting, by using the block information, the embed-information embedded in the embed-image.

11. The image processing device of claim 2, wherein the block information includes a block number of the information block.

12. The image processing device of claim 2, wherein the block information includes a size of a region occupied by the information pattern representing the information block.

13. The image processing device of claim 2, wherein the block information includes a shape of a region occupied by the information pattern representing the information block.

14. The image processing device of claim 2, wherein the block information includes error correction information for the information block.

* * * * *